United States Patent
Ortmann

Patent Number: 5,324,052
Date of Patent: Jun. 28, 1994

[54] TOOL HOLDER

[75] Inventor: Harald Ortmann, Biberach, Fed. Rep. of Germany

[73] Assignee: Robert Bosch GmbH, Stuttgart, Fed. Rep. of Germany

[21] Appl. No.: 14,385

[22] Filed: Feb. 5, 1993

[30] Foreign Application Priority Data

Feb. 28, 1992 [DE] Fed. Rep. of Germany ... 9202611[U]

[51] Int. Cl.$^5$ .............................................. B27B 19/09
[52] U.S. Cl. ....................................... 279/83; 30/339; 30/392; 279/97
[58] Field of Search ............... 279/76, 83, 97; 30/339, 30/337, 338, 392–394; 83/697, 698

[56] References Cited

U.S. PATENT DOCUMENTS

| 2,443,050 | 6/1948 | Menking | 83/697 X |
| 3,750,283 | 8/1973 | Hoffman | 30/339 X |
| 4,106,181 | 8/1978 | Mattchen | 30/339 X |
| 4,204,692 | 5/1980 | Hoffmann | 279/81 |
| 4,351,112 | 9/1982 | Nalley | 30/392 |
| 5,103,565 | 4/1992 | Holzer, Jr. | 279/76 X |

Primary Examiner—Steven C. Bishop
Attorney, Agent, or Firm—Michael J. Striker

[57] ABSTRACT

A tool holder, particularly for longitudinally extending saw blade having a flat shaft, the tool holder has two walls defining a slot therebetween for insertion of a tool, a dowel arranged in one of the walls perpendicularly to the slot and engageable in a passage of a tool shaft and a spring-loaded clamping member to press the tool against one of the walls.

10 Claims, 1 Drawing Sheet

TOOL HOLDER

BACKGROUND OF THE INVENTION

The present invention relates to a tool holder with releasable clamping of tools, especially flat tools.

More particularly, it relates to a tool holder which has a slot for inserting a tool and a dowel arranged in a wall of the slot perpendicularly to it to engage in a passage of a tool shaft.

Tool holders of the above mentioned general type are known in the art. One such tool holder is disclosed for example in the U.S. Pat. No. 4,204,692. It has a spring-loaded dowel and a counterholder displaceable transversely to a saw blade having substantially the same diameter. This tool holder can clamp only saw blades of the same blade thicknesses.

SUMMARY OF THE INVENTION

Accordingly, it is an object of the present invention to provide a tool holder, which avoids the disadvantages of the prior art.

More particularly, it is an object of the present invention to provide a tool holder, which can clamp tools of different blade thicknesses and which provides a better holding in a sawing direction.

In keeping with these objects and with others which will become apparent hereinafter, one feature of the present invention resides, briefly stated, in a tool holder of the above mentioned type in which the tool is pressable with a spring-loaded clamping piece against a wall of the slot, in particular provided with the dowel.

When the tool holder is designed in accordance with the present invention, it eliminates the disadvantages of the prior art and provides for the above specified advantages.

In addition, the operation of the tool holder is facilitated since after the insertion of the tool it is automatically closed. An active turning moment is required only for opening of the tool holder.

In accordance with an advantageous feature of the present invention, the clamping piece which holds the tool is held with a prestressed spiral spring by its torque in a closed position. The provision of a large-area pressing surface in the clamping piece improves the lateral hold of the inserted saw blade. The same purpose is achieved when the slot is formed so that the saw blade holders of the saw blade at its small sides is provided.

In accordance with another feature of the present invention, the clamping piece is inserted in a threaded opening in the tool holder, and a prestressed spiral spring applies a torque to the clamping piece. The clamping piece can be arranged at the side of the wall which is opposite to the dowel. The pressing surface of the clamping piece which faces the tool can be greater than the end surface of the dowel.

The clamping piece can have a milled knob for manual opening of the tool holder. The slot can laterally guide the tool. A web can be arranged centrally on the slot so that a narrowing end of the tool shaft can abut on it.

The tool holder can be mounted on the displacement rod of a saw, in particular by a pin. The width of the slot considered in the clamping direction can increase the maximum shaft thickness of the inserted tool insignificantly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
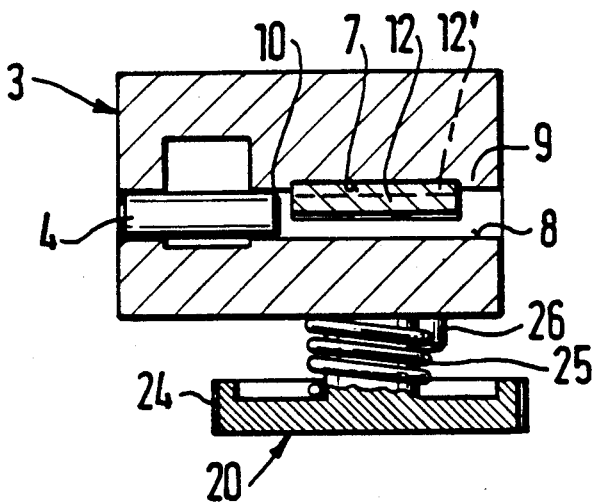
FIG. 2 is a view showing a section taken along the line II—II in FIG. 1.

Reference numeral 2 identifies a displacement rod 2 of a not shown compass or saber saw which is reciprocatingly driven by a motor. A tool holder 3 is arranged on a free end of the displacement rod 2 which is accessible from outside. The tool holder 3 is fixedly connected with the displacement rod 2 by means of a pin 4 shown in FIGS. 2 and 3. The tool holder 3 has a substantially parallelepiped shape and is provided with a flat slot 5 which is open at a side facing away from the displacement rod 2. The slot 5 is limited at its longitudinal sides by two opposite walls 7 and 8. Guiding strips 9 and 10 are provided on the small sides on one wall 7. The distance between the guiding strips 9 and 10 correspond to the width of a shaft 11 of a tool 12 inserted in the slot 5 and formed as a saw blade. In the drawings a saw blade 12 with a thicker shaft 11 and a saw blade 12' with a thinner shaft are shown. The latter is shown in a broken line.

Figure 1:
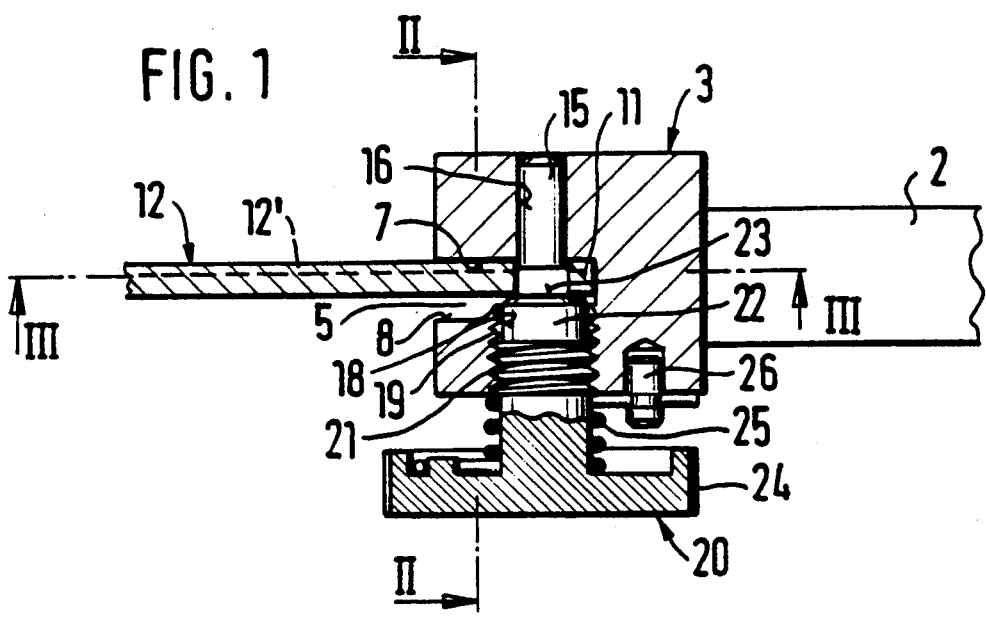
FIG. 1 is a view schematically showing a longitudinal section of the tool holder.
Figure 3:
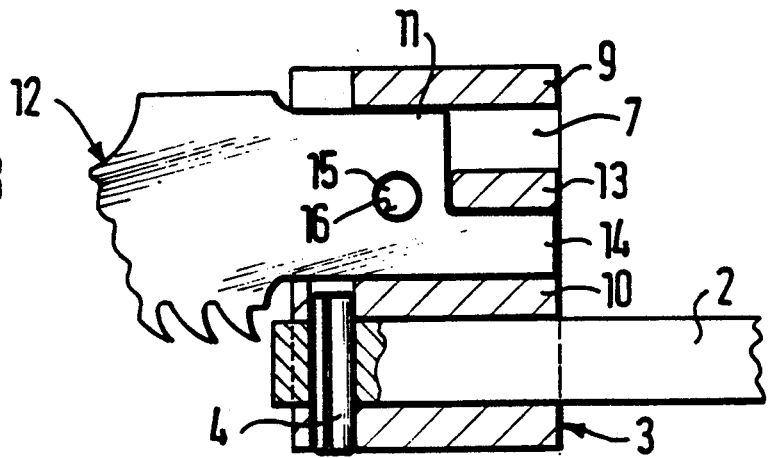
FIG. 3 is a view showing a section taken along the line III—III in FIG. 1.

A holding rib 13 is arranged centrally between the guiding strips 9 and 10. A reduced end 14 of the tool shaft 11 is arranged on the holding rib 13 as shown in FIG. 3. Similarly, a dowel 15 is arranged centrally between the guiding strips 9 and 10 before the holding rib 13 in the wall 7. The dowel engages in a passage 16 in the shaft 11. The dowel projects outwardly from the wall 7 by a distance which is smaller than the thickness of the thinnest tool shaft 11 to be used (see FIG. 1).

The wall 8 of the slot 5 has an opening 18 located opposite to the dowel 15 and provided with a thread 19. A clamping member 20 with an outer thread 21 is inserted in the thread 19. The clamping member 20 has a cylindrical part 22 provided with a thread 21 and having a pressing surface 23, and a milled head 24 for manual actuation. A spiral spring 25 is arranged around the cylindrical part 22. Its one end is fixed in the milled head 24 and its another end is fixed in a pin 26 mounted in the tool holder 3.

The spiral spring 25 applies on the clamping member 20 a torque, so that it is moved in the thread 19/21 in a direction toward the dowel 15. A saw blade inserted in the slot 5 is thereby pressed by the pressing surface 23 of the clamping member 20 against the wall 7 of the tool holder 3. The pressing surface 23 of the clamping member 20 is greater than the end surface of the dowel 15. The saw blade 12 is thereby fixed in all directions so that it is loaded. The saw blade 12 is fixed in the plane of the saw blade or in other words transverse to the dowel 15, by the guiding strips 9, 10, the holding ribs 13, and the dowel 15. The saw blade 12 is clamped against the wall of the tool holder transversely to the plane of the saw blade by the clamping member 20. In this direction the loads of the saw blade 12 are the lowest.

For opening the tool holder 3 the clamping member 20 is engaged at the milled head 24 and turned against the force of the spiral spring 25. Thereby it is withdrawn back into the wall 8 so that the tool 12 can be moved from the dowel 15 and withdrawn from the tool holder.

When it is necessary to use another or new saw blade 12, it is inserted with its shaft into the slot 5, placed on the dowel 15 and milled head 24 is released. The clamping of the saw blade is performed automatically by the torque applied by the spiral spring 25 to the clamping member 20.

It will be understood that each of the elements described above, or two or more together, may also find a useful application in other types of constructions differing from the types described above.

While the invention has been illustrated and described as embodied in a tool holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A tool holder, particularly for a longitudinally extending saw blade shaft having a flat shaft, the tool holder comprising two walls defining a slot therebetween for insertion of a tool; a dowel arranged in one of said walls perpendicularly to said slot and engageable in a passage of a tool shaft; and a spring loaded clamping member to press the tool against one of said walls, at least one of said walls having a threaded opening, said clamping member having a thread engaging in said threaded opening.

2. A tool holder as defined in claim 1, wherein said clamping member is arranged to press the tool against said one wall provided with said dowel.

3. A tool holder, as defined in claim 1; and further comprising a prestressed torque spring applying a torque to said clamping member.

4. A tool holder as defined in claim 1, wherein said walls include another wall located opposite to said first mentioned wall provided with said dowel, said clamping member being arranged on said another wall.

5. A tool holder as defined in claim 1, wherein said dowel has an end surface, said clamping member having a pressing surface adapted to press the tool against said dowel and being greater than said end surface of said dowel.

6. A tool holder as defined in claim 1, wherein said clamping member has a head for manual opening of the tool holder.

7. A tool holder as defined in claim 1, wherein said slot is formed so that the tool can be laterally guided in said slot.

8. A tool holder as defined in claim 1; and further comprising a web which is arranged centrally of said slot so that a reduced end of the tool shaft abuts at one side against said web.

9. A tool holder as defined in claim 1; and further comprising means for mounting a displacement rod of a saw in the tool holder, said mounting means including at least one pin.

10. A tool holder as defined in claim 1, wherein the tool to be held has a predetermined maximum shaft thickness, said slot having a width which is measured in a clamping direction and insignificantly exceeds the shaft thickness of the tool.

* * * * *